United States Patent [19]

Turri et al.

[11] Patent Number: 5,476,910
[45] Date of Patent: Dec. 19, 1995

[54] THERMOPLASTIC POLYESTERS CONTAINING PERFLUOROPOLYOXYALKYLENE SEQUENCE

[75] Inventors: Stefano Turri, Milan; Giuseppe Gianotti, Novara; Marinella Levi, Milan; Claudio Tonelli, Concorezzo, all of Italy

[73] Assignee: Ausimont, S.p.A., Milan, Italy

[21] Appl. No.: 228,564

[22] Filed: Apr. 15, 1994

[30] Foreign Application Priority Data

Apr. 19, 1993 [IT] Italy .................. MI93A0759

[51] Int. Cl.⁶ ................................. C08G 63/672
[52] U.S. Cl. ................. 525/437; 528/191; 528/299
[58] Field of Search ........................ 528/299, 191; 525/437

[56] References Cited

U.S. PATENT DOCUMENTS

| | | |
|---|---|---|
| 3,715,378 | 2/1973 | Sianesi et al. . |
| 3,810,874 | 5/1974 | Mitsch et al. . |
| 3,847,978 | 11/1974 | Sianesi et al. . |

FOREIGN PATENT DOCUMENTS

| | | |
|---|---|---|
| 0538827 | 4/1993 | European Pat. Off. . |
| 538827A2 | 4/1993 | European Pat. Off. . |
| 1217871 | 12/1971 | United Kingdom . |
| 8703608 | 6/1987 | WIPO ..................... 528/299 |

OTHER PUBLICATIONS

"Synthesis of polyesters–perfluoropolyethersblock copolymers," Pilati, et al., *Polymer Bulletin*, vol. 28, pp. 151–157 (1992).

Primary Examiner—Patricia A. Short
Attorney, Agent, or Firm—Bryan Cave

[57] ABSTRACT

Fluorinated thermoplastic elastomers having a block structure:

$$-[-R_f-H_1-H_2-H_1-]-$$

where $-R_f-$ is a perfluoropolyoxyalkylene sequence of formula:

$$-CF_2O-(CF_2CF_2O)_m-(CF_2O)_n-CF_2-$$

with m/n=0.2÷5, $H_1$ and $H_2$, equal or different from each other, are bivalent radicals having arylene, alkylarylene, alkylene or cycloalkylene structure, optionally containing fluorine and/or other heteroatoms selected among oxygen, sulphur, nitrogen. Such products are obtainable by utilizing a perfluoropolyoxyalkylene diol having a functionality at least equal to 1.97, preferably at least equal to 1.99, and are characterized by a tensile strength at 23° C. at least 50% higher than that of the corresponding polyesters obtained starting from perfluoropolyoxyalkylene diols having a functionality not higher than 1.96.

14 Claims, No Drawings

THERMOPLASTIC POLYESTERS CONTAINING PERFLUOROPOLYOXYALKYLENE SEQUENCE

The present invention relates to thermoplastic polyesters containing perfluoropolyoxyalkylene sequences, and the preparation process thereof. More particularly, the present invention relates to thermoplastic polyesters consisting of flexible blocks having a perfluoropolyoxyalkylene structure alternated with rigid blocks having aromatic, aliphatic and/or cycloaliphatic structure, and the preparation process thereof.

It is known from U.S. Pat. No. 3,810,874 a broad class of fluorinated polymers containing perfluoropolyoxyalkylene sequences of formula:

$$-CF_2O-(CF_2CF_2O)_m-(CF_2O)_n-CF_2-$$

where m/n=0.2–5, linked each other by non-fluorinated monomeric units. To this class belong the polyesters obtainable by polycondensation of a perfluoropolyoxyalkylene corresponding to formula (I), functionalized at both ends with a —OH group, with a bicarboxylic acid or an non-fluorinated derivative thereof. Such polymers are endowed with high flexibility at low temperatures, with glass transition temperature ($T_g$) values lower than $-78°$ C. They can be used as sealing agents or for the manufacture of sealing elements to be employed under severe conditions, for instance in the aerospace field.

As illustrated in the above U.S. Pat. No. 3,810,874, which is herein incorporated by reference, the perfluoropolyoxyalkylene diols of formula:

$$HO-CH_2-CF_2O-(CF_2CF_2O)_m-(CF_2O)_n-CF_2-CH_2-OH$$

are preparable by reducing the diacylfluorides of formula:

$$FCO-CF_2O-(CF_2CF_2O)_m-(CF_2O)_n-CF_2-COF.$$

with lithium and aluminium hydride.

The bridging group between perfluoropolyoxyalkylene chain and —OH groups can be in its turn modified, for instance by ethoxylation reaction with ethylene oxide from which diols of formula:

$$H(OCH_2CH_2)_sOCH_2-CF_2O-(CF_2\ CF_2O)_m-(CF_2O)_n-CF_2-CH_2-O(CH_2CH_2O)_sH,$$

where s is a number comprised between 1 and 3, are obtained.

As known, perfluoropolyoxyalkylenes having —COF end groups, and therefore the diols deriving therefrom, are indeed perfluoropolyoxyalkylene mixtures in which the bifunctional products are mixed to monofunctional products, wherein one terminal is a functional group, while the other terminal is a perfluoroalkyl group having 1 or 2 carbon atoms, or also to small amounts of non-functionalized products, wherein both terminals are of perfluoroalkyl type.

This fact is an unavoidable consequence of the method for preparing such products, which, as well known, consists in submitting to photooxidation tetrafluoroethylene under ultraviolet radiations, as described for instance in GB-1,217,871 and U.S. Pat. No. 3,715,378 patents, and subsequent reduction of the peroxidic bridges, as described for instance in U.S. Pat. No. 3,847,978. From such process, chains consisting of —CF$_2$CF$_2$O— and —CF$_2$O— perfluorooxyalkylene units are obtained, having as terminals —CF$_3$, —CF$_2$CF$_3$, —COF, —CF$_2$COF groups, besides minor amounts of —CF$_2$H groups. What is obtained is therefore a mixture of products having a perfluoropolyoxyalkylene structure in which the macromolecules having two functional end groups (—COF and/or —CF$_2$COF) do not exceed 94–98% by moles, corresponding to an average functionality of the mixture of 1.88–1.96.

The fluorinated polyesters of the prior art, obtained by polycondensation starting from perfluoropolyoxyalkylene diols with a functionality not higher than 1.96, though showing low $T_g$, generally comprised between $-120°$ and $-100°$ C., and therefore having, at least potentially, good elastic properties at low temperatures, have unsatisfactory mechanical characteristics at room temperature and especially at high temperatures. This fact strongly limits the rating temperature.

Moreover, such products show characteristics which can vary, depending from the ratio between the molecular weight of the perfluoropolyoxyalkylene sequences and the molecular weight of the non-fluorinated connecting groups, from those of a viscous liquid to those of a rigid but fragile solid. They are, therefore, products quite unsuitable for uses where high mechanical resistance is required, for instance for the manufacture of structural elements.

The Applicant has now found a new class of fluorinated polyesters, consisting of flexible blocks having perfluoropolyoxyalkylene structure alternated with rigid blocks having aromatic, aliphatic and/or cycloaliphatic structure, which, depending on the chemical structure of the rigid blocks and on the ratio between the molecular weight of the latter and the molecular weight of the flexible blocks, have properties which can vary from those of a rigid plastic material to those of an elastomer. In any event, such products are endowed with very good mechanical properties in a wide range of temperatures, along with high thermal and chemical resistance and low $T_g$ values, generally comprised between $-120°$ and $-110°$ C.

Object of the present invention are, therefore, fluorinated thermoplastic polyesters having a block structure:

$$-(-R_f-H_1-H_2-H_1-)-\qquad (I)$$

wherein:

—$R_f$— is a perfluoropolyoxyalkylene unit of formula:

$$-CF_2O-(CF_2CF_2O)_m-(CF_2O)_n-CF_2-\qquad (II)$$

where m and n are numbers such that the m/n ratio is comprised between 0.2 and 5.;

—$H_1$— and —$H_2$—, equal or different from each other, are bivalent radicals having arylene, alkylarylene, alkylene or cycloalkylene structure, optionally containing fluorine and/or other heteroatoms selected from oxygen, sulphur, nitrogen;

the —$R_f$—, —$H_1$— and —$H_2$— units being linked to each other by ester groups; said polyesters having a tensile strength (measured at 23° C. according to ASTM Method D412-D) at least 50%, preferably at least 100%, higher than that of the corresponding polyesters obtained starting from perfluoropolyoxyalkylene diols having a functionality not higher than 1.96.

A further object of the present invention is a process for the preparation of the fluorinated polyesters of formula (I), which comprises:

(a) reacting a perfluoropolyoxyalkylene diol with a functionality at least equal to 1.97, preferably at least equal to 1.99, having formula:

$$HO-Z-CF_2O-(CF_2CF_2O)_m-(CF_2O)_n-CF_2-Z-OH\qquad (III)$$

wherein: m and n are numbers such that the m/n ratio is comprised between 0.2 and 5; Z is a bivalent organic group; with a bicarboxylic acid of formula:

$$HO-CO-H_1-CO-OH \quad (IV)$$

or a derivative thereof, where $H_1$ is defined as above; the molar ratio between the bicarboxylic acid (IV), or the derivative thereof, and the diol (III) being comprised between 2 and 50, preferably between 5 and 10;
(b) reacting the so obtained prepolymer with a diol of formula:

$$HO-H_2-OH \quad (V)$$

where $H_2$ is defined as above; the molar ratio between the diol (V) and the prepolymer being comprised between 0.9 and 2, preferably between 1 and 1.5.

The perfluoropolyoxyalkylene units of formula (II) have generally a number average molecular weight comprised between 500 and 10,000, preferably between 1,000 and 4,000.

With perfluoropolyoxyalkylene diols of formula (III) having a functionality at least equal to 1.97 we mean mixtures of bifunctional perfluoropolyoxyalkylene diols with the corresponding monofunctional and/or neutral products, in which the content of bifunctional products is higher than 98.5% by moles.

In formula (III), Z is preferably a bivalent organic group of formula:

$$-CH_2-(OCH_2CH_2)_s- \quad (VI)$$

wherein s is a number comprised between 0 and 3.

Perfluoropolyoxyalkylene diols of such functionality can be obtained by an enrichment or separation process by means of column chromatography of perfluoropolyoxyalkylene mixtures having a hydroxy functionality lower than or equal to 1.96, as directly obtainable from the synthesis process. Such enrichment or separation process is described in Italian patent application No. 2774/MI 91A in the name of the Applicant, which is herein incorporated by reference.

It is a process wherein the functionalized perfluoropolyoxyalkylene is eluted by means of an apolar fluorinated solvent (for instance Delifrene® LS, i.e. 1,1,2-trichloro-1,2,2-trifluoroethane) through a column containing as stationary phase a compound (for instance alumina or silica gel) having active sites and/or groups, capable of forming polar bonds or interactions, or hydrogen bonds, with the perfluoropolyoxyalkylene hydroxyl end groups. Such stationary phase is previously treated with a mixture formed by an apolar fluorinated solvent and by a polar solvent (for instance a ketone or an alcohol) and having an eluotropic strength ε of at least 0.2 with respect to silica. When the first elution is over, during which the separation of the neutral and monofunctional species from the bifunctional ones is obtained, the latter remaining in the column, the perfluoropolyoxyalkylene with a functionality of about 2 is eluted with the same apolar fluorinated solvent/polar solvent mixture used before, in a volume ratio comprised between 9/1 and 1/1. The stationary phase is then restored by washing with an apolar fluorinated solvent. Only one passage through the column is usually sufficient to obtain the product suitable to the purposes of the present invention. If necessary it is possible to further increase the functionality of the so obtained product with other passages through the column.

The $H_1$ and $H_2$ units, equal or different from each other, can have an arylene $C_6-C_{18}$, alkylarylene $C_7-C_{24}$, alkylene $C_1-C_8$ or cycloalkylene $C_4-C_{16}$ structure, optionally containing fluorine and/or other heteroatoms selected from oxygen, sulphur, nitrogen.

In the process of the present invention, the bicarboxylic acid of formula (IV), or the derivatives thereof, can be selected, for instance, from: terephthalic acid, isophthalic acid, cyclohexane-1,4-bicarboxylic acid, 4,4'-bicarboxydiphenylether, 4,4'-bicarboxy-benzophenone, 2,2'-diphenic acid, 4,4'-diphenic acid, or mixtures thereof.

The diol of formula (V) can be selected, for instance, from: isopropylidenbiphenol (bisphenol A), hexafluoro-isopropylidenbiphenol (bisphenol AF), 4,4'-dihydroxybenzophenone, 4,4'-dihydroxyphenylsulphone, 4,4'-dihydroxydiphenyl, hydroquinone, resorcinol, naphthalen-1,3-diol and isomers thereof, cyclohexane-1,4-diol, decaline-1,5-diol, or mixtures thereof.

Steps (a) and (b) of the process of the present invention can be carried out either in organic solvent or in bulk, or also in heterogeneous phase, according to techniques well known in the art (see for instance V. V. Korshak, S. V. Vinogradova, "Polyesters", Pergamon Ed., 1965).

Preferably, step (a) is carried out in solution in a suitable organic solvent (for instance Delifrene® LS, dichloromethane, toluene, and the like), at a temperature generally comprised between 30° and 100° C. By starting from an acyl halide, an approximately stoichiometric amount of a tertiary amine (for instance pyridine or triethylamine) is added to the solution, in order to neutralize the hydro-halogenic acid formed during the reaction.

Step (b), on the contrary, is preferably carried out in heterogeneous phase, since this is a technique that can be easily performed also under mild conditions (that is at relatively low temperatures and without metal catalysts). Undesired transesterification reactions are thus avoided, which would destroy, at least partially, the prearranged block structure, with formation of random sequences. The reaction is carried out, according to known techniques, by adding, quickly and under stirring, the prepolymer obtained in step (a) to a solution of diol (V) dissolved in a suitable organic solvent (for instance Delifrene® LS, dichloromethane, or mixtures thereof) and previously basified with a strong base in approximately stoichiometric amount with respect to the diol. The reaction temperature is generally comprised between 10° and 70° C., preferably between 20° and 40° C. To the reaction medium phase transfer agents are preferably added, such as ammonium, phosphonium or quaternary arsonium salts, in concentrations generally comprised between 1 and 20% by moles with respect to the diol (V). Alternatively to the phase transfer agents, emulsifying agents can be employed, such as n-alkyl-sodium sulphonates. The reaction time can vary within broad limits depending on the reactant structure. Generally, the reaction is completed in a time comprised between 5 minutes and 3 hours. The polyester is then separated from the reaction medium according to conventional techniques, for instance by precipitation in a non-solvent (for example acidified methanol).

Both step (a) and step (b) can also be carried out in bulk, according to known techniques (see for instance G. Odian, "Principles of Polymerization", John Wiley & Sons, 1991, p. 97 and following). In such case, it is preferred to use activated derivatives of the bicarboxylic acids (IV), such as for instance acyl chlorides, in order to avoid the use of metal catalysts, which, as previously explained, can cause, in combination with high temperatures, transesterification reactions.

The polyesters object of the present invention, depending on the molecular weight and on the structure of the rigid and flexible blocks, can have various applications, such as thermoprocessable elastomers with high performances, shock-resistant rigid materials for the manufacture of structural elements, sealing materials and adhesives having high thermochemical resistance, reactive oligomers for transesterification processes, etc.

Some working examples of the present invention are now given, which have a merely illustrative purpose but are not limitative of the scope of the invention itself.

EXAMPLE

Preparation of the Prepolymer

In a 500 ml three-neck glass flask, equipped with thermometer, condenser and dropping funnel, 13.23 g of distilled terephthaloylchloride and 220 ml of anhydrous Delifrene® LS (Delifrene® LS=1,1,2-trichlorotrifluoroethane) were charged. The temperature was brought to 50° C. until a complete dissolution of the acyl chloride is achieved. A solution was added dropwise, slowly and under a nitrogen flow, said solution consisting of 50 ml of Delifrene® LS, 1.15 ml of anhydrous pyridine and 22 g (8.15 mmoles) of a perfluoropolyoxyalkylene diol of formula:

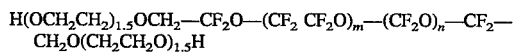

having m/n=1, number average molecular weight $M_n$=2700 and functionality f=1.995, obtained according to the chromatographic enrichment process described in Italian patent application No. 2774 MI 91A, starting from the corresponding product having f=1.95.

When the addition, which lasted 4 hours, was over, the solution was heated at 50° C. for 24 hours. The precipitate, formed by pyridinium hydrochloride, was removed by filtration and the solution was dried. The excess of tereftaloylchloride was then distilled (T=125°–140° C., p=$10^{-1}$ mmHg) until a limpid oil (23.2 g) was obtained, which at $^1$H-NMR analysis resulted to have the following structure:

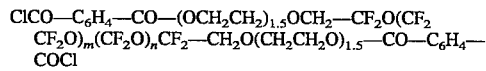

Polymerization

To a solution consisting of 1.48 g of bisphenol A (BPA) dissolved in 34 ml of distilled $H_2O$ and 25.88 ml of NaOH 0.5017M, 147 mg of triethylbenzylammonium chloride (TEBA) and 18 g of the prepolymer prepared as described above, dissolved in 60 ml of a mixture dichloromethane/Delifrene® LS in volume ratio 1/1, were quickly added under vigorous stirring.

After 30 minutes of reaction, the polymeric mass was precipitated in acidified methanol, dried and weighed. 18.5 g of polyester were then obtained, having an intrinsic viscosity [η] (determined according to ASTM Method D2857-70 at 30° C., in Delifrene® LS/trifluoroethanol with a volume ratio 9/1) equal to 0.81 dl/g.

EXAMPLE 2 (comparative)

Preparation of $H_1$—$R_f$—$H_1$ Prepolymer

Following the same modalities of Example 1, a prepolymer was prepared by reacting 60 g of a perfluoropolyoxyalkylene diol, having the same formula as reported in Example 1, but with $M_n$=3400 and functionality f=1.950, dissolved in 50 ml of Delifrene® LS and 3.033 ml of anhydrous pyridine, with 27.69 (0.136 mols) of distilled terephthaloylchloride. 65.0 g of a prepolymer having the same formula as in Example 1 were thus obtained.

Polymerization

Following the same modalities as in Example 1, a polyester was prepared by reacting 1.44 g of BPA, dissolved in 20 ml of distilled $H_2O$ and 25.06 ml of NaOH 0.5017M, with 140 mg of TEBA and 22 g of the prepolymer prepared as described above, dissolved in 57 ml of a mixture dichloromethane/Delifrene® with a volume ratio of 1/1.

22.6 g of a polyester were so obtained, having an intrinsic viscosity (determined according to ASTM Method D2857-70 at 30° C., in Delifrene® LS/trifluoroethanol with a volumetric ratio of 9/1) equal to 0.40 dl/g.

EXAMPLE 3

To a solution formed by 2.42 g of bisphenol AF (BPAF) dissolved in 37 ml of distilled $H_2O$ and 28.78 ml of NaOH 0.5017M, 164 mg of triphenylmethylphosphonium bromide (TPMP) and 20 g of the prepolymer of Example 1, dissolved in 65 ml of a dichloromethane/Delifrene® LS mixture in a volume ratio of 1/1, were quickly added under vigorous stirring.

After 30 minutes of reaction, the polymeric mass was precipitated in acidified methanol, dried and weighed. 20.8 g of polyester were so obtained, having an intrinsic viscosity (determined according to ASTM Method D2857-70 at 30° C., in Delifrene® LS/trifluoroethanol with a volume ratio of 9/1) equal to 0.98 dl/g.

EXAMPLE 4 (comparative)

Following the same modalities of Example 3, a polyester was prepared by reacting 1.92 g of BPAF, dissolved in 78 ml of distilled $H_2O$ and 22.8 ml of NaOH 0.5017M, with 130 mg of TPMP and 20 g of the prepolymer of Example 2, dissolved in 100 ml of a dichloromethane/Delifrene® mixture with a volume ratio of 1/1.

20.3 g of a polyester were so obtained, having an intrinsic viscosity (determined according to ASTM Method D2857-70 at 30° C., in Delifrene® LS/trifluoroethanol with a volume ratio of 9/1) equal to 0.41 dl/g.

EXAMPLE 5

To a solution consisting of 0.91 g of dihydroxydiphenylsulphone (BPS) dissolved in 30 ml of distilled $H_2O$ and 14.48 ml of NaOH 0.5017M, 83 mg of triethylbenzylammonium chloride (TEBA) and 10 g of the prepolymer of Example 1, dissolved in 66 ml of a dichloromethane/Delifrene® LS mixture with a volume ratio of 2/1, were quickly added under vigorous stirring.

After 30 minutes of reaction, the polymeric mass was precipitated in acidifed methanol, dried and weighed. 10.5 g of a polyester were so obtained, having an intrinsic viscosity (determined according to ASTM Method D2857-70 at 30° C., in Delifrene® LS/trifluoroethanol with a volume ratio of 9/1) equal to 0.75 dl/g.

EXAMPLE 6 (comparative)

Following the same modalities of Example 5, a polyester was prepared by reacting 0.714 g of BPS, dissolved in 39 ml of distilled $H_2O$ and 11.36 ml of NaOH 0.5017M, with 64 mg of TEBA and 10 g of the prepolymer of Example 2, dissolved in 50 ml of a dichloromethane/Delifrene® mixture with a volume ratio of 2/1.

10.0 g of a polyester were so obtained, having an intrinsic viscosity (determined according to ASTM Method 2857-70 at 30° C., in Delifrene® LS/trifluoroethanol with a volume ratio of 9/1) equal to 0.29 dl/g.

EXAMPLE 7

To a solution consisting of 0.815 g of dihydroxydiphenylketone (BPK) dissolved in 45 ml of distilled $H_2O$ and 15.2 ml of NaOH 0.5017M, 85 mg of triethylbenzylammonium chloride (TEBA) and 10 g of the prepolymer of Example 1, dissolved in 106 ml of a dichloromethane/Delifrene® LS mixture with a volume ratio of 2/1, were quickly added under vigorous stirring.

After 30 minutes of reaction, the polymeric mass was precipitated in acidified methanol, dried and weighed. 10.1 g of a polyester were so obtained, having an intrinsic viscosity (determined according to ASTM Method D2857-70 at 30° C., in Delifrene® LS/trifluoroethanol with a volume ratio of 9/1) equal to 0.85 dl/g.

EXAMPLE 8 (comparative)

Following the same modalities of Example 7, a polyester was prepared by reacting 1.83 g of BPK, dissolved in 40 ml of distilled $H_2O$ and 37.5 ml of NaOH 0.5017M, with 195 mg of TEBA and 30 g of the prepolymer of Example 2, dissolved in 123 ml of a dichloromethane/Delifrene® mixture with a volume ratio of 2/1.

30.8 g of a polyester were so obtained, having an intrinsic viscosity (determined according to standard ASTM D2857-70 at 30° C., in Delifrene® LS/trifluoroethanol with a volume ratio of 9/1) equal to 0.31 dl/g.

EXAMPLE 9

In a glass reactor 22.07 g of the prepolymer of Example 1 and 1.408 g of 4,4'-dihydroxybiphenyl (BP) were charged. While maintaining the reactor under a slight flow of dry nitrogen, the temperature was brought to 100° C. and then the following heating program was carried out:

from 100° C. to 180° C. with a heating rate of 10° C./min;

isotherm at 180° C. for 30 min;

from 180° C. to 210° C., after evacuation ($p=10^{-1}$ mmHg);

isotherm at 210° C. for 1 hour.

After cooling, 21.0 g of a polyester were discharged, having an intrinsic viscosity (determined according to ASTM Method D2857-70 at 30° C., in Delifrene® LS/trifluoroethanol with a volume ratio of 9/1) equal to 0.70 dl/g.

EXAMPLE 10 (comparative)

Example 9 was repeated, using 20.0 g of the prepolymer of Example 2 and 0.968 g of BP. 19.1 g of a polyester were obtained, having an intrinsic viscosity (determined according to ASTM Method D2857-70 at 30° C., in Delifrene® LS/trifluoroethanol with a volume ratio of 9/1) equal to 0.32 dl/g.

The polyester samples obtained according to the above examples were characterized as follows:

Thermal Stability

It was evaluated by thermogravimetric analysis (TGA) measurements by following a heating program from 35° C. to 300° C. in nitrogen atmosphere, followed by an isotherm of 30 min at 300° C. For all the samples, the start of the weight loss was observed at a temperature comprised between 260° C. and 280° C., with a total loss lower than 2%. After such a test, a variation of the intrinsic viscosity within 10% with respect to the initial value was observed.

Stability to Hydrolysis

The polyester samples were exposed:

(1) to $H_2O$ for 25 days at 25° C.;

(2) to $H_2O$ for 8 hours at 100° C.;

(3) to $H_2SO_4$ (10% by weight) for 7 days at 25° C.;

(4) to NaOH (10% by weight) for 7 days at 25° C.

For all the samples no appreciable variation of the intrinsic viscosity before and after exposure was observed.

Mechanical Tests

The tensile tests were carried out according to ASTM Method D412-D on samples obtained by die-cutting from compression molded plates. Shore A hardness was measured according to ASTM Method D2240. The results are reported in Table 1.

Thermal Characterization

By differential scanning calorimetry (DSC) measurements, glass transition temperature ($T_g$) and melting temperature ($T_m$) were determined. Besides the typical $T_g$ of the fluorinated phase, generally comprised between −120° and −110° C., in some cases another glass transition ($T'_g$) at temperatures lower than −10° C. was observed.

The obtained results are reported in Table 1.

TABLE 1

| EX. | [η] (dl/g) | Shore A Hardness | Modulus (MPa) 20% | Modulus (MPa) 100% | Tensile Strength (MPa) | Elongation at break (%) | $T_g$ (°C.) | $T'_g$ (°C.) | $T_m$ (°C.) |
|---|---|---|---|---|---|---|---|---|---|
| 1 | 0.81 | 65 | 7.35 | 1.94 | 11.3 | 590 | −112 | −15 | n.d. |
| 2(*) | 0.40 | 53 | 4.65 | 1.24 | 4.21 | 732 | −120 | −19 | n.d. |
| 3 | 0.98 | 47 | 2.4 | 1.12 | 5.5 | 562 | −113 | −15 | n.d. |
| 4(*) | 0.41 | 38 | 1.9 | 0.71 | 2.26 | 716 | −118 | −22 | n.d. |
| 5 | 0.75 | 87 | 21.7 | 5.54 | 8.4 | 460 | −112 | n.d. | +105 |
| 6(*) | 0.29 | 84 | 16.3 | n.d. | 4.38 | 52 | −119 | n.d. | +106 |
| 7 | 0.85 | 89 | 23.1 | 6.03 | 9.2 | 494 | −112 | n.d. | +138 |
| 8(*) | 0.31 | 82 | 16.3 | n.d. | 4.06 | 38 | −119 | n.d. | +135 |
| 9 | 0.70 | — | — | — | — | — | −112 | n.d. | +98 |
| 10(*) | 0.32 | — | — | — | — | — | −119 | n.d. | +99 |

(*)comparative examples
n.d. = not determinable

We claim:

1. Fluorinated thermoplastic polyesters having a block structure:

$$-[-R_f-H_1-H_2-H_1-]- \quad (I)$$

wherein:

—$R_f$— is a perfluoropolyoxyalkylene unit of formula:

$$-CF_2O-(CF_2CF_2O)_m-(CF_2O)_n-CF_2- \quad (II)$$

wherein m and n are numbers such that the ratio m/n is between 0.2 and 5;

—$H_1$— and —$H_2$—, equal or different from each other, are bivalent radicals having arylene, alkylarylene, alkylene, or cycloalkylene structure, optionally containing fluorine and/or heteroatoms selected from oxygen, sulfur, and nitrogen; the —$R_f$—, —$H_1$—, and —$H_2$— units being linked to each other by ester groups;

the fluorinated thermoplastic polyesters being obtained from perfluoropolyoxyalkylene diols having the formula:

$$HO-Z-CF_2O-(CF_2CF_2O)_m-(CF_2O)_n-CF_2-Z-OH \quad (III)$$

wherein m and n are numbers such that the m/n ratio is between 0.2 and 5, and Z is a bivalent organic group, the perfluoropolyoxyalkylene diols having a functionality of at least 1.97, and a number average molecular weight from 500 to 10,000.

2. Polyesters according to claim 1, wherein the perfluoropolyoxyalkylene units have a number average molecular weight between 1,000 and 4,000.

3. The fluorinated thermoplastic polyesters of claim 1, wherein the fluorinated thermoplastic polyesters are obtained from perfluoropolyoxyalkylene diols having a functionality of at least 1.99.

4. The fluorinated thermoplastic polyesters of claim 1, wherein the fluorinated thermoplastic polyesters are obtained from perfluoropolyoxyalkylene diols having a number average molecular weight from 1,000 to 4,000.

5. Sealing agents comprising the fluorinated thermoplastic polyesters of claim 1.

6. Structural elements comprising the fluorinated thermoplastic polyesters of claim 1.

7. A process for the preparation of fluorinated thermoplastic polyesters having a block structure:

$$-[-R_f-H_1-H_2-H_1-]- \quad (I)$$

wherein:

—$R_f$—is a perfluoropolyoxyalkylene unit of formula:

$$-CF_2O-(CF_2CF_2O)_m-(CF_2O)_n-CF_2- \quad (II)$$

wherein m and n are numbers such that the ratio m/n is between 0.2 and 5;

—$H_1$— and —$H_2$—, equal or different from each other, are bivalent radicals having arylene, alkylarylene, alkylene, or cycloalkylene structure, optionally containing fluorine and/or heteroatoms selected from oxygen, sulfur, and nitrogen; the —$R_f$—, —$H_1$—, and —$H_2$— units being linked to each other by ester groups;

the fluorinated thermoplastic polyesters being obtained from perfluoropolyoxyalkylene diols having the formula:

$$HO-Z-CF_2O-(CF_2CF_2O)_m-(CF_2O)_n-CF_2-Z-OH \quad (III)$$

wherein m and n are numbers such that the m/n ratio is between 0.2 and 5, and Z is a bivalent organic group, the perfluoropolyoxyalkylene diols having a functionality of at least 1.97 and a number average molecular weight from 500 to 10,000;

the process comprising:

(a) reacting (1) a perfluoropolyoxyalkylene diol with a functionality at least equal to 1.97 and a molecular weight from 500 to 10,000, having the formula $$HO-Z-CF_2O-(CF_2CF_2O)_m-(CF_2O)_n-CF_2-Z-OH \quad (III)$$

where m and n are numbers such that the ratio m/n is between 0.2 and 5 and Z is a bivalent organic group;

with (2) a dicarboxylic acid of formula:

$$HO-CO-H_1-CO-OH \quad (IV)$$

or a derivative thereof, to form a pre-polymer;

wherein $H_1$ has the meaning given above and the molar ratio between the dicarboxylic acid (IV) or the derivative thereof and the diol (III) is between 2 and 50;;

(b) reacting the prepolymer from step (a) with a diol of formula:

$$HO-H_2-OH \quad (V)$$

wherein $H_2$ has the meaning given above and the molar ratio between the diol (V) and the prepolymer is between 0.9 and 2.

8. Process according to claim 7, wherein in formula (III) Z is a bivalent organic group of formula:

$$-CH_2-(OCH_2CH_2)_s- \quad (VI)$$

wherein s is a number between 0 and 3.

9. Process according to claim 7 wherein the perfluoropolyoxyalkylene diol of formula (III) has a functionality at least equal to 1.99.

10. Process according to claim 7, wherein the molar ratio between dicarboxylic acid (IV), or the derivative thereof, and diol (III) is between 5 and 10.

11. Process according to claim 7, wherein the molar ratio between diol (V) and prepolymer is between 1 and 1.5.

12. Process according to claim 7, wherein the step (b) is carried out in heterogeneous phase.

13. The process of claim 7, wherein the perfluoropolyoxyalkylene diol of step (a) has a number average molecular weight from 1,000 to 4,000.

14. Fluorinated thermoplastic polyesters obtained by the process according to claim 7.

* * * * *

UNITED STATES PATENT AND TRADEMARK OFFICE
CERTIFICATE OF CORRECTION

PATENT NO. : 5,476,910
DATED : Dec. 19, 1995
INVENTOR(S) : Stefano Turri, et al.

It is certified that error appears in the above-indentified patent and that said Letters Patent is hereby corrected as shown below:

| Column | Line | Delete | Insert |
|--------|------|--------|--------|
| 9 | 14 | "$H_i$" | -- $H_l$ -- |

Signed and Sealed this

Fourteenth Day of May, 1996

Attest:

BRUCE LEHMAN

Attesting Officer   Commissioner of Patents and Trademarks